United States Patent [19]

Weiser et al.

[11] Patent Number: 5,342,916

[45] Date of Patent: Aug. 30, 1994

[54] CONDENSATION POLYMERS OF SULFONATED PHENOLS, UREA, OTHER ORGANIC NITROGEN-BASES, AND FORMALDEHYDE, AND THEIR USE AS TANNING AGENTS AND AS SPRAYING AIDS FOR REDISPERSIBLE POLYMER POWDERS

[75] Inventors: Juergen Weiser, Schriesheim; Wolfgang Reuther, Heidelberg; Karl Stork, Weisenheim a. Berg; Ortwin Schaffer, Ludwigshafen; Gernot Franzmann, Bobenheim; Thomas Schwerzel, Meckenheim; Maximilian Angel, Mutterstadt; Joachim Pakusch, Ludwigshafen; Brigitte Wegner, Speyer, all of Fed. Rep. of Germany

[73] Assignee: BASF Aktiengesellschaft, Ludwigshafen, Fed. Rep. of Germany

[21] Appl. No.: 889,631

[22] Filed: May 28, 1992

[30] Foreign Application Priority Data

Jun. 1, 1991 [DE] Fed. Rep. of Germany ....... 4118007

[51] Int. Cl.$^5$ ................................................ C08G 8/04
[52] U.S. Cl. ..................... 528/150; 528/129; 528/158; 528/162; 528/211; 525/497; 525/498; 525/499; 525/500; 8/94.24; 8/94.21
[58] Field of Search ............... 528/129, 150, 158, 162, 528/211; 525/497, 498, 499, 500; 8/94.24, 94.21

[56] References Cited

U.S. PATENT DOCUMENTS

| 3,784,648 | 1/1974 | Bergmeister et al. | 523/332 |
| 3,852,374 | 12/1974 | Erdmann et al. | 528/150 |
| 4,009,996 | 3/1977 | Wurmli | 528/162 |
| 4,285,848 | 8/1981 | Hickson | 528/163 |
| 5,155,164 | 10/1992 | Graf et al. | 524/596 |

FOREIGN PATENT DOCUMENTS

| 2020449 | 1/1991 | Canada . |
| 0687066 | 12/1939 | Fed. Rep. of Germany . |
| 0701563 | 12/1940 | Fed. Rep. of Germany . |
| 1113457 | 5/1964 | Fed. Rep. of Germany . |
| 2049114 | 4/1972 | Fed. Rep. of Germany . |
| 3427694 | 2/1986 | Fed. Rep. of Germany . |
| 3923229 | 1/1991 | Fed. Rep. of Germany . |
| 3933478 | 4/1991 | Fed. Rep. of Germany . |
| 1548180 | 10/1968 | France . |
| 0890150 | 2/1962 | United Kingdom . |

*Primary Examiner*—John Kight, III
*Assistant Examiner*—Jones Richard Lee
*Attorney, Agent, or Firm*—Oblon, Spivak, McClelland, Maier & Neustadt

[57] ABSTRACT

Condensation polymers of sulfonated phenols, urea, other organic nitrogen-bases and formaldehyde, obtainable by (A) sulfonation of phenols with from 1.0 to 1.5 moles of sulfuric acid per mole of phenol and (B) condensation of these sulfonation products with
  (a) from 0.5 to 1.8 moles of urea per mole of phenol,
  (b) from 0.001 to 0.5 moles of at least one other organic nitrogen-base per mole of phenol, and
  (c) from 1.0 to 3.0 moles of formaldehyde per mole of phenol.

The condensation polymers are suitable for use as tanning agents in the leather and skin-producing industry and as spraying aids for redispersible polymer powders.

7 Claims, No Drawings

CONDENSATION POLYMERS OF SULFONATED PHENOLS, UREA, OTHER ORGANIC NITROGEN-BASES, AND FORMALDEHYDE, AND THEIR USE AS TANNING AGENTS AND AS SPRAYING AIDS FOR REDISPERSIBLE POLYMER POWDERS The present invention relates to novel condensation polymers of sulfonated phenols, urea, other organic nitrogen-bases, and formaldehyde, to a process for their manufacture, to their use as tanning agents in the leather and skin-producing industry and as spraying aids for redispersible polymer powders, and to tanning agents and spraying aids containing said condensation polymers.

Synthetic tanning agents based on condensation polymers of sulfonated phenols or mixtures of sulfonated and unsulfonated phenols, urea, and formaldehyde are known for example from German Patents 0,687,066 (1), 0,701,563 (2), and 1,113,457 (3).

The German Patent 2,158,610 (4) describes condensation polymers of sulfonated phenols, formaldehyde, urea, melamine and/or dicyanodiamide and bisulfite, which are obtained by reaction of precondensates (adjusted to pH's of from 10 to 13) of phenolsulfonic acid, urea and formaldehyde with sulfited methylol compounds of urea, melamine and/or dicyanodiamide. These condensation polymers are suitable for use as tanning agents.

However, the cited tanning agents suffer from a number of drawbacks. Leathers and skins produced therewith are not sufficiently light-fast and heat-resistant, i.e. they discolor readily and quickly lose their soft hand and their fullness and become brittle. The tanning agents themselves show poor stability in storage and are sparingly soluble in water. For this reason, their tanning action is sometimes unsatisfactory.

German Laid-open Patent Specification 3,923,229 (5) describes condensation-poly(phenolsulfonic acid-co-formaldehyde)s as auxiliaries for the manufacture of polymer powders from dispersions. The use of these spraying aids leads to polymer powders that are very readily redispersible and resistant to blocking. One disadvantage, however, is that due to the brown color of the spraying aid the resulting polymer powders are also brown. Since these spraying aids are water-soluble products, there is the danger of them being washed out again after the redispersed polymer has undergone conversion to film and has then come into contact with water. This leads, for example when the polymer powders are used in cement-like systems, to a visible color change of the end product.

Another class of spraying aid, namely condensation-poly(melaminesulfonic acid-co-formaldehyde)s, is described in the German Laid-open Patent Specification 2,049,114 (6). These do yield colorless disperse powders, but the redispersibility and the blocking properties of the atomized products are still in need of improvement.

Thus it is an object of the present invention to overcome the aforementioned drawbacks of the prior art.

Accordingly, we have found condensation polymers of sulfonated phenols, urea, other organic nitrogen-bases, and formaldehyde, which are obtainable by (A) the sulfonation of phenols with from 1.0 to 1.5 moles of sulfuric acid per mole of phenol and (B) the condensation of these sulfonation products with
 (a) from 0.5 to 1.8 moles of urea per mole of phenol,
 (b) from 0.001 to 0.5 mole of at least one other organic nitrogen-base per mole of phenol and
 (c) from 1.0 to 3.0 moles of formaldehyde per mole of phenol.

Examples of suitable phenols are halophenols such as chlorophenols, alkylphenols such as cresols or xylenols, resorcinol, pyrogallol, naphthols and also unsubstituted phenol, also bisphenols such as dihydroxydiphenylpropanes or dihydroxydiphenylsulfones. We prefer 0-, m-, and p-cresols, p-mono-($C_2$–$C_4$-alkyl)-Phenols and especially unsubstituted phenol.

The sulfonation (A) is usually carried out using 96–98 w/w strength sulfuric acid, which is commercially available as concentrated sulfuric acid. Alternatively, with less reactive phenols, anhydrous, i.e. 100% w/w strength sulfuric acid or oleum having an $S_3$ content of up to ca 65% w/w, and in particular up to ca 30% w/w, can be used. The sulfonation of the phenols functions in many cases equally well using aqueous sulfuric acid having a maximum content of water of ca 10% w/w.

Other suitable organic nitrogen-bases are, primarily:
melamine (2,4,6-triamino-1,3,5-triazine)
melamine derivatives such as hydroxy-($C_2$–$C_{20}$-alkyl)-melamines, bis-hydroxy-($C_2$–$C_{20}$-alkyl)-melamines or tris-hydroxy-($C_2$–$C_{20}$-alkyl)-melamines, in which the alkyl group may be linear or branched and the hydroxyl group may be attached to a primary, secondary, or tertiary carbon atom, hydroxyaryl melamines or melamines having from one to three poly(alkylene oxide) chains attached to the nitrogen atoms. These polyalkoxylated compounds are preferably formed by ethoxylation, propoxylation, or butoxylation of melamine and have degrees of alkoxylation of from 2 to 4;
melem (2,5,8-triamino-1,3,4,6,7,9,9b-heptaazaphenalene) or
melem derivatives such as hydroxy-($C_2$ –$C_{20}$-alkyl)-melems or melems having poly(alkylene oxide) side-chains attached to the nitrogen atoms, preferably side-chains of poly(ethylene oxide), poly(propylene oxide), or poly(butylene oxide), each having a degree of alkoxylation of from 2 to 4;
guanamines (6-substituted 2,4-diamino-1,3,5-triazines) such as benzoguanamine, acetoguanamine, caprinoguanamine or isobutyroguanamine;
derivatives of guanamines such as N-hydroxy-($C_2$–$C_{20}$-alkyl)-guanamines, in which the alkyl group may be linear or branched and the hydroxyl group may be attached to a primary, secondary, or tertiary carbon atom, or guanamines having one or two poly(alkylene oxide) chains attached to the nitrogen atoms, which polyalkoxylated compounds are preferably prepared by ethoxylation, propoxylation, or butoxylation of guanamines and each have a degree of alkoxylation of from 2 to 4;
dicyanodiamide.

Of these, melamine, N-polyalkoxylated melamines having a degree of alkoxylation of from 2 to 4, and dicyanodiamide are particularly preferred.

The formaldehyde is usually used in the form of a from 10 to 50% w/w strength aqueous solution; commercially, from 30 to 35% w/w strength aqueous solutions are available. Alternatively, use may be made of substances capable of eliminating formaldehyde under the conditions of the reaction, such as paraformaldehyde.

The sulfonation (A) is carried out using from 1.0 to 1.5 moles and preferably from 1.05 to 1.4 moles of sulfuric acid per mole of phenol. The operation is usually carried out at temperatures of from 50° to 150° C. and preferably from 65° to 120° C., and usually at standard pressure. The reaction is normally complete after from 2 to 4 h.

Prior to the addition of the components (a) to (c), the sulfonation product is advantageously taken up in water to make it possible to carry out the condensation step (B).

The condensation (B) is advantageously effected in acidic medium at pH's of from 0 to about 5. The high hydrogen ion concentration is usually provided by excess sulfuric acid from the sulfonation step (A) and/or by the dissociation of the sulfonation products from (A) in water. Setting specified values within the aforementioned pH-range is effected using the usual acids and bases.

For each mole of phenol there will be used, as component (a), from 0.5 to 1.8 moles and preferably from 0.8 to 1.2 moles of urea, as component (b), from 0.001 to 0.5 mole and preferably from 0.01 to 0.3 mole and more preferably from 0.05 to 0.2 mole of at least one other organic nitrogen-base, and as component (c), from 1.0 to 3.0 moles and preferably from 1.5 to 2.5 moles and more preferably from 1.7 to 2.0 moles of formaldehyde.

The order of addition of the components (a) and (b) and the methods used therefor are in principle not critical. However, the component (c) should be added last and over a prolonged period of from about 15 min to 4 h, and preferably from 30 min to 2 h, at a temperature of from about 60° to about 80° C. Condensation is then usually continued at temperatures of from about 60° to 95° C. for a period of from 15 min to 3 h to complete the reaction.

The reaction sequence (A) and (B) may be carried out in a single stage or as two stages run concurrently. In the two-stage procedure, different amounts of starting materials are used in the different stages. The effluents of the two stages are post-condensed together, after which the overall composition corresponds to the values claimed for the amounts used.

The condensed acidic resin milks are adjusted to about pH 7 by the addition of usual bases and are then, by the addition of acids, preferably carboxylic acids such as formic acid, acetic acid, propionic acid, benzoic acid, malonic acid, succinic acid, glutaric acid, adipic acid or mixtures thereof, again brought to a pH of advantageously from 3 to 5 and preferably from 3.5 to 4. The resulting condensation polymers may be used either as an aqueous solution or in the form of spray-dried powders.

The present invention also relates to a process for the manufacture of condensation polymers of sulfonated phenols, urea, other organic nitrogen-bases and formaldehyde, wherein
(A) phenols are sulfonated with from 1.0 to 1.5 moles of sulfuric acid per mole of phenol and
(B) these sulfonation products are condensed with
  (a) from 0.5 to 1.8 moles of urea per mole of phenol,
  (b) from 0.001 to 0.5 moles of at least one other organic nitrogen-base per mole of phenol, and
  (c) from 1.0 to 3.0 moles of formaldehyde per mole of phenol.

The condensation polymers of the invention are extremely well-suited for use as tanning agents in the leather and skin-producing industry.

Thus the condensation polymers of the invention may be used for self-tannage and pretannage of unhaired hides and unhaired skins in aqueous liquor. The procedure advantageously adopted is to treat the pickled unhaired hides, e.g., smoothed cattlehides having a skived thickness of from 1.5 to 4 mm, or unhaired skins, e.g., smoothed sheepskins, at a pH of from 2 to 7 and preferably from 2.5 to 4, and at a temperature of from 15° to 40° C. and preferably from 20° to 35° C., over a period of from 3 to 20 h, with an aqueous solution of a condensation polymer of the invention. The treatment is carried out, for example, by fulling in a drum. The requisite amount of condensation polymers of the invention is normally, based on the weight of the unhaired hide, from 2 to 30% w/w and preferably from 5 to 25% w/w. The liquor ratio, i.e. the percentage liquor-to-goods ratio by weight, is usually from 30 to 200% in the case of unhaired hides and from 100 to 2000% in the case of unhaired skins, based, in each case, on the weight of the unhaired goods.

Following said treatment, the leather or pelt is usually adjusted to a pH of from 2 to 8 and preferably from 3 to 5, this being effected, for example, by the use of magnesium oxide, sodium carbonate, sodium bicarbonate or an organic acid such as formic acid or salts thereof, optionally treated with other tanning agents, and, if desired, dyed and stuffed toward the end, or following conclusion, of the tanning operation.

Furthermore, the condensation polymers of the invention may be used for co-tannage of unhaired hides and unhaired skins together with the tanning agents of the main tannage, e.g., a chrome or alum tannage. In this case, the working conditions with respect to pH, temperature, and duration of the treatment are adjusted to meet the requirements of the main components of the tannage, and the same applies to the processing equipment and the liquor ratio and also to the post-treatment. Here, the requisite amount of condensation polymers of the invention is, based on the weight of the unhaired hide, normally from 0.1 to 20% w/w and preferably from 0.5 to 15% w/w.

In addition, the condensation polymers of the invention may be used for the post-tannage of pretanned leathers and pelts, e.g., chrome leathers, in aqueous liquor. In this case the procedure adopted is usually to tan the pickled unhaired hides and skins, e.g. smoothed cattlehides having skived thicknesses of from 1.5 to 4 mm, with, for example, a conventional chrome tanning agent such as a chromium(III) salt, e.g., chromium(III) sulfate, in known manner, to de-acidify the resulting pretanned skins ("wetblues" in chrome tannage), and to follow up with a treatment, at a pH of from 2 to 7 and preferably from 2.5 to 4, and at temperatures of from 15° to 60° C. and preferably from 25 to 45° C., over a period of from 1 to 12 h, with an aqueous solution of the condensation polymers of the invention. This treatment is carried out, for example, by fulling in a drum. The requisite amount of condensation polymers of the invention is normally, based on the skived weight of the leather, from 2 to 30% w/w and preferably from 5 to 25% w/w. The liquor ratio is usually from 30 to 200% in the case of unhaired hides and from 100 to 2000% in the case of unhaired skins, based, in each case, on the skived weight of the leather.

Following, and possibly prior to, if necessary, said treatment, the leather or pelt is usually adjusted to a pH of from 3 to 5, this being effect, for example, by the use of magnesium oxide or an organic acid such as formic acid or salts thereof, and, if desired, it is dyed and stuffed toward the end, or after conclusion, of the treatment.

The thus post-tanned leather or pelt may have been additionally treated with other tanning agents such as other polymeric tanning agents or syntans prior to post-tanning with the condensation polymers of the invention. Another possibility is to use the condensation polymers of the invention concurrently with such additional tanning agents, e.g., in the main tannage.

Suitable additional or concurrently used tanning agents are all usual agents having a tanning action on unhaired hides or unhaired skins. Comprehensive treatment of such tanning agents is to be found in, e.g., Ullmanns Encyklopädie der technischen Chemie, Third Edition, Vol. XI, pp. 585 to 612 (1960). Specifically, the types of tanning agent which may be used are mineral tanning agents, e.g., salts of chromium, aluminum, titanium, and zirconium, synthetic tanning agents such as the aforementioned polymeric tanning agents and syntans, and vegetable tanning agents.

The leathers and skins produced with the condensation polymers of the invention, especially pre-chrome-tanned leathers and skins, show an extremely high degree of fastness to light and heat resistance and are further distinguished by good fullness, high softness and firmness of grain.

Leathers and skins which have been produced using the condensation polymers of the invention by self-tannage or, for example, by post-tannage of chrome leather, are very easy to dye on account of their light color and are particularly suitable for the production of leathers of light shades.

The condensation polymers of the invention themselves have a sufficiently high tanning action, and they are adequately water-soluble and stable in storage.

One particular advantage of the condensation polymers of the invention is the fact that they possess only an extremely low residual content of toxic or health-hazardous unsulfonated monomeric phenols.

The present invention also relates to the tanning agents of the invention themselves and to a process for self-tannage, pretannage or co-tannage of unhaired hides and unhaired skins and for post-tannage of leathers and pelts, using the condensation polymers of the invention.

The condensation polymers of the invention are also highly suitable for use as spraying aids for redispersible polymer powders.

Thus the condensation polymers of the invention may be added to chiefly waterborne polymer dispersions alone or together with other conventional spraying aids, before these are atomized to form redispersible polymer powders. Atomization of the polymer dispersions containing the condensation polymers of the invention may be carried out in known manner, particularly with the use of single-channel or multiple-channel nozzles or atomizing discs. To this end, the dispersions are generally sprayed into a stream of hot air, in which the water and/or the solvent evaporates. Atomization may be carried out at atmospheric pressure or under reduced pressure. In general, the temperature of the stream of hot air used for such spray-drying is from 100° to 200° C. and preferably from 120° to 170° C. The separation of the dried redispersible polymer powders can be effected in conventional manner, in particular with the use of cyclones or filtration traps.

Suitable constituent monomers for the dispersions used are primarily olefinically unsaturated monomers, especially acrylic acid, methacrylic acid, $C_1$–$C_8$-alkyl acrylates and methacrylates, such as methyl (meth)acrylate, ethyl (meth)acrylate, n-butyl (meth)acrylate or 2-ethylhexyl (meth)acrylate, vinylaromatic monomers such as styrene, vinyl esters of carboxylic acids such as vinyl acetate, vinyl propionate, vinyl laurate, or vinyl esters of versatic acids, diolefines such as butadiene, and also vinyl chloride, vinylidene chloride, acrylonitrile, itaconic acid, acrylamide and methacrylamide, N-methylol (meth)acrylamide, or in the case of copolymers: ethylene. The polymers may be homopolymers or copolymers of two or more constituent monomers.

A preferred monomeric composition is as follows:

From 30 to 75% w/w of a $C_1$–$C_8$-alkyl acrylate or methacrylate, from 25 to 70% w/w of styrene, and from 0 to 5% w/w of acrylamide or methacrylamide or a mixture thereof.

The amount of spraying aid used has in principle no upper limit but is usually, based on the weight of the solids content of the polymer dispersions, from 1 to 50% w/w and preferably from 5 to 30% w/w and more preferably from 5 to 20% w/w. It is also possible for the spraying aids of the invention to be used together with other conventional auxiliaries, e.g., other spraying aids such as the compounds cited in (5) and (6) or such as poly(vinyl pyrrolidone)s, poly(vinyl alcohol)s or poly(vinyl pyrrolidone-co-vinyl acetate)s or inert inorganic additives such as silicates or chalks.

The spraying aids of the invention may be used either in neutral form (about pH 7) or in acidic form (pH preferably from 3 to 5) following the addition of acids. The redispersible polymer powders produced with the spraying aids of the invention exhibit adequate resistance to blocking, show little tendency to settle on redispersion and are, above all, readily redispersible. They may be cast to films after having been stirred into water, which films have tensile strengths at break and percentage elongations at break which fully conform to the usual requirements. Furthermore they are colorless, which means that they do not change the color of the end products produced therewith. They can be stored at room temperature without any problem and without blocking.

The present invention also relates to the spraying aids of the invention themselves and to a process for atomizing polymer dispersions for the manufacture of redispersible polymer powders using the condensation polymers of the invention.

MANUFACTURING EXAMPLES

In the following examples, the parts and percentages are by weight.

Example 1

[condensation-Ploy(phenolsulfonic acid-co-urea-co-melamine-co-formaldehyde)]

94 g (1.0 mole) of phenol were stirred with 112 g (1.1 moles) of concentrated sulfuric acid for 3 h at 105° C. Following the addition of 100 g water, there were added 8 g (0.06 mole) of melamine and 54 g (0.90 mole) of urea. 190 g (1.90 moles) of 30% strength aqueous formaldehyde were added over a period of 60 min at 70° C. The pH was then adjusted, with 50% strength NaOH, to 2.0, and condensation was continued for 2 h at 90° C. The pH was then adjusted, with 50% strength NaOH, to 7 and then relowered to 3.8 using 48 g of a mixture of 30 parts of succinic acid, 42 parts of glutaric acid and 28 parts of adipic acid. The content of residual phenol was 7 ppm.

Example 2

[condensation-Poly(phenolsulfonic acid-co-urea-co-melamine-co-formaldehyde)]

Stage 1

94 g (1.0 mole) of phenol were stirred with 125 g (1.22 moles) of concentrated sulfuric acid for 3 h at 105° C. stirred. After the addition of 46 g of water, 64.5 g (1.07 moles) of urea were added. Over a period of 60 min, there were added, at from 65° to 70° C., 190 g (1.90 moles) of 30% strength aqueous formaldehyde. Following 15 min of stirring at 70° C., the pH was adjusted, with 110 g of 50 % strength NaOH, to 2.0.

Stage 2

94 g (1.0 mole) of phenol were stirred with 110 g (1.08 moles) of concentrated sulfuric acid for 3 h at from 65° to 70° C. Following the addition of 50 g of water, there were added 17 g (0.13 mole) of melamine and 48 g (0.80 mole) of urea. Over a period of 90 min there were added, at from 65° to 70° C., 175 g (1.75 moles) of 30% strength aqueous formaldehyde. Following 15 min of stirring at 70° C., the pH was adjusted, with 90 g of 50% strength NaOH, to 2.0.

The united solutions from stages 1 and 2 were stirred at 90° C. for 2 hours. The pH was adjusted, with 50% strength NaOH, to 7.0. The addition of 52 g of a mixture of 30 parts of succinic acid, 42 parts of glutaric acid and 28 parts of adipic acid brought the pH down to 3.8. The content of residual phenol was 10 ppm.

Example 3

[condensation-Poly(phenolsulfonic acid-co-urea-co-melamine-co-formaldehyde)]

Stage 1

141 g (1.50 moles) of phenol were stirred with 187 g (1.83 moles) of concentrated sulfuric acid for 3 h at 105° C. After the addition of 69 g of water, there were added 97.5 g (1.62 moles) of urea. Over a period of 60 min, there were added 285 g (2.85 moles) of 30% strength aqueous formaldehyde at from 65° to 70° C. Following 15 min of stirring at 70° C., the pH was adjusted, with 173 g of 50% strength NaOH, to 2.0.

Stage 2

141 g (1.50 moles) of phenol were stirred with 165 g (1.62 moles) of concentrated sulfuric acid for 3 h at 105° C. Following the addition of 75 g of water there were added 23 g (0.18 mole) of melamine and 72 g (1.20 moles) of urea. Over a period of 90 min at from 65° to 70° C., there were added 262.5 g (2.63 moles) of 30% strength aqueous formaldehyde. Following 15 min of stirring at 70° C., the pH was adjusted, with 124 g of 50% strength NaOH, to 2.0.

The united solutions from stages 1 and 2 were stirred at 90° C. for 2 h. The pH was adjusted, with 50% strength NaOH, to 7.0. The addition of 26 g of formic acid brought the pH down to 3.8. The content of residual phenol was 3 ppm.

Example 4

[condensation-Poly(phenolsulfonic acid-co-urea-co-dicyanodiamide-co-formaldehyde)]

94 g (1.0 mole) of phenol were stirred with 112 g of (1.1 moles) of concentrated sulfuric acid for 3 h at 105° C. Following the addition of 100 g of water there were added 15 g (0.18 mole) of dicyanodiamide and 54 g of (0.90 mole) of urea. 195 g (1.95 moles) of 30% strength aqueous formaldehyde were added over a period of 60 min at 70° C. The pH was then adjusted, with 50% strength NaOH, to 2.0 and condensation was continued for 2 h at 90° C. The pH was then adjusted, with 50% strength NaOH, to 7, and 48 g of a mixture of 30 parts of succinic acid, 42 parts of glutaric acid, and 28 parts of adipic acid was added to bring the pH down to 3.8. The content of residual phenol was 10 ppm.

Example 5

[condensation-Poly(phenolsulfonic acid-co-urea-co-tris(5-hydroxy-3-oxapentyl)- co-melamine-co-formaldehyde )]

94 g of (1.0 mole) of phenol were stirred with 112 g of (1.1 moles) of concentrated sulfuric acid for 3 h at 105° C. Following the addition of 100 g of water, there were added 39 g of (0.1 mole) of tris(5-hydroxy-3-oxapentyl)-melamine and 48 g of (0.8 mole) of urea. 175 g of (1.75 moles) of 30% strength aqueous formaldehyde were added over a period of 60 min at 80° C. The pH was then adjusted, with 50% strength NaOH, to 2.0 and condensation was continued for 2 h at 70° C. The pH was again adjusted, with 50% strength NaOH, to 7 and there were added 50 g of a mixture of 30 parts of succinic acid, 42 parts of glutaric acid, and 28 parts of adipic acid to bring the pH down to 3.8. The content of residual phenol was 5 ppm.

Examples illustrating the use of the condensation polymers of the invention as tanning agents in the production of leather In the following examples the percentages are by weight and are based on the weight of the unhaired or shaved hide respectively.

Example 6

(Self-tannage)

To pickled smoothed cattlehide having a skived thickness of 3 mm in 50% of pickling liquor there were added portionwise, at room temperature, 25% of the condensation polymer from example 1 dissolved in 75% of water. After a tanning period of ca 15 h in a drum at pH 3.4 and 20° C., the goods were briefly rinsed and then stuffed with 5% of a commercial light-fast fat liquor and fixed with 0.5% of formic acid.

The shrinkage temperature of the leather was 73° C. The leather obtained after drying and staking showed good fullness and a high degree of whiteness. In addition, it exhibited a very high degree of fastness to light and good heat resistance.

Example 7

(Post-tannage of chrome leather)

A cattlehide wetblue having a skived thickness of 1.2 mm was first washed with 300% of water having a temperature of 30° C. and 0.5% of oxalic acid, after which it was de-acidified in 100% of liquor at 30° C. containing sodium bicarbonate and sodium formate to a pH of 5.3. Following a brief rinse, the leather was pretreated in 100% of liquor at 40° C. containing 2% of commercial acrylic acid-based polymeric tanning agent and 1% of titanium dioxide. The leather was then post-tanned portionwise with, in all, 8% of condensation polymer from example 2 at 60° C. over a period of 1 h in a drum, adjusted, with 0.5% of formic acid, to a pH of 3.8 and then post-treated with 2% of condensation polymer from example 2 as described above. After another rinse, the leather was stuffed in 100% of liquor containing 10% of a commercial synthetic fat liquor at 60° C. and fixed with 1% of formic acid to a pH of 3.0.

There was obtained, after drying, staking, and milling, an almost white nappa leather having good fullness and smooth grain. In addition, it showed high fastness to light and good heat resistance.

Example 8

(Post-tannage of chrome leather)

A cattlehide wetblue having a skived thickness of 1.5 mm was rinsed and washed in the usual manner and then de-acidified in 100% of liquor at 40° C. containing sodium formate and sodium bicarbonate, to a pH of 4.5. It was then post-tanned in 100% of fresh liquor containing 8% of condensation polymer from example 3 at 40° C. in a drum. Following 90 min of fulling, the leather was again rinsed and then dyed in 100% of liquor at 50° C containing a conventional metal complex leather dye, stuffed in the usual manner, and adjusted, with formic acid, to a pH of 4.0. After a brief rinse, the leather was stretched, dried and staked.

There was obtained a well dyed, compact leather having excellent fullness and a supple, smooth grain, making it suitable, for example, for use as a shoe-upper leather.

Example 9

(Post-tannage of chrome leather)

In a manner similar to that described in Example 8 there was obtained, using the condensation polymer from Example 4, a well filled, firm-grained leather of slightly lighter shade.

Example 10

(self-tannage)

In a manner similar to that described in Example 6, there was obtained, using 8% of condensation polymer from Example 5, a well filled, soft leather having a shrinkage temperature of 77° C. and showing a high degree of fastness to light and good heat resistance.

Examples illustrating the use of the condensation polymers of the invention as spraying aids for redispersible polymer powders In the following examples the parts and percentages are by weight.

The dispersions D1 to D11 (cf Table 1 ) were prepared according to the following general manufacturing instructions:

A solution of 0.31 g of sodium peroxydisulfate in 142.0 g of water was mixed with 5.2 g of ethoxylated p-isooctyl phenol (degree of ethoxylation 25) and heated to 90° C. There were then added, over a period of 3.5 h at this temperature, the feeds 1 and 2 concurrently.

Feed 1.

537.7 g of a mixture of monomers of the composition stated in Table 1 below, 1, 6 g of ethoxylated p-isooctyl phenol (degree of ethoxylation 25), and 3.6 g of the Na salt of an ethoxylated and sulfated p-isooctyl phenol (degree of ethoxylation 25) in 158.8 g of water;

Feed 2

2.79 g of sodium peroxydisulfate in 65.0 g of water.

Polymerization was then continued for 1 h. The mixture was then adjusted to the listed solids content, if necessary, by the addition of water. After cooling to room temperature, the pH was adjusted, using 20% strength aqueous calcium hydroxide slurry, to a value of ca 9.

Table 1 lists the composition, the solids content, and the glass transition temperature $T_g$ of the resulting aqueous dispersions.

TABLE 1

DISPERSIONS

| Dispersion | Composition [%] | | | | Solids content [%] | $T_g$ [°C.] |
|---|---|---|---|---|---|---|
| D1 | 58 EHA | 39 S | 2 AM | 1 MAm | 57.2 | −7 |
| D2 | 50 EHA | 47 S | 2 AM | 1 MAm | 55.5 | 5 |
| D3 | 45 EHA | 52 S | 2 AM | 1 MAm | 57.0 | 15 |
| D4 | 37 EHA | 60 S | 2 AM | 1 MAm | 56.1 | 31 |
| D5 | 32 EHA | 65 S | 2 AM | 1 MAm | 55.5 | 41 |
| D6 | 70 nBA | 26 S | 4 AM | | 45.5 | −12 |
| D7 | 60 nBA | 36 S | 4 AM | | 45.2 | 3 |
| D8 | 55 nBA | 41 S | 4 AM | | 45.4 | 11 |
| D9 | 52 nBA | 45 S | 2 AM | 1 MAm | 54.9 | 16 |
| D10 | 48 nBA | 48 S | 4 AM | | 45.3 | 21 |
| D11 | 40 nBA | 56 S | 4 AM | | 44.8 | 34 |

The dispersions D1 to D5 were made up with the aid of 2% of a homopolymer of 2-acrylamido-2,2-dimethylethanesulfonic acid acting as protective colloid.

EHA = 2-ethylhexyl acrylate,
nBA = n-butyl acrylate,
S = styrene,
AM = acrylamide,
MAm = methacrylamide Examples 11 to 23 and Comparative Examples A to C The dispersions D1 to D11 were mixed with the amounts of the spraying aids stated in Table 2 below (the percentages are based on the solids content of the dispersions) and the mixtures were diluted with water to give a total solids content of 35%. The spraying aids of the invention were represented in all cases by the condensation polymer from Example 2.

The mixtures were dried in a Niro "Minor" laboratory drying apparatus rated to dry 2 kg of mixture per hour, via a twin-channel nozzle.

TABLE 2

SPRAY DRYING OPERATIONS

| Example No. | Dispersion | Spraying aids [amount in %] |
|---|---|---|
| 11 | D1 | 20 |
| 12 | D1 | 15 |
| 13 | D1 | 10 |
| 14 | D2 | 20 |
| 15 | D3 | 20 |
| 16 | D4 | 20 |
| 17 | D5 | 20 |
| 18 | D6 | 20 |
| 19 | D7 | 20 |
| 20 | D8 | 20 |
| 21 | D9 | 15 |
| 22 | D10 | 20 |
| 23 | D11 | 20 |
| Comparative Examples | | |
| A | D1 | 20 |

TABLE 2-continued

SPRAY DRYING OPERATIONS

| Example No. | Dispersion | Spraying aids [amount in %] |
|---|---|---|
| B | D1 | 2 |
| C | D4 | 20 |

In examples A to C a commercial spraying aid based on a condensation-poly(melaminesulfonic acid-co-formaldehyde) as described in reference (6) was used.

Die resulting powders were tested with respect to redispersibility and antiblocking properties. In addition, films made from the redispersed powders were tested for tensile strength at break and percentage elongation at break. The results of these tests are summarized in Table 3 below.

TABLE 3

APPLICATION TECHNOLOGY TESTS

| Powder from Example No. | Redispersibility [rating] | Resistance to blocking [rating] | Tensile strength at break [Nmm$^{-2}$] | Elongation at break [%] |
|---|---|---|---|---|
| 14 | 2 | 4 | 3.5 | 400 |
| 15 | 2 | 3 | 6.5 | 320 |
| 16 | 2 | 4 | — | — |
| 17 | 2 | 2 | — | — |
| 18 | 3 | 4 | 2.0 | 780 |
| 19 | 2 | 3 | 4.5 | 500 |
| 20 | 2 | 3 | 6.5 | 400 |
| 22 | 2 | 3 | 9.5 | 280 |
| 23 | 2 | 3 | — | — |

Redispersibility: The ratings range from 1 (= very readily redispersible) to 5 (= not redispersible).

Resistance to blocking: The powder was placed in a vessel (diameter=6.5 cm) and a cylindrical body weighing 4840 g (diameter=6.2 cm) was placed on the powder. After three days, the powder was examined to determine the extent of blocking; the ratings range from 1 (best result) to 5 (poorest result).

Tensile strength and percentage elongation, at break: The values were measured in accordance with DIN 53,455. The films were rolled at a rate of 200 mm/min.

We claim:

1. A condensation polymer of sulfonated phenol, urea, other organic nitrogen bases and formaldehyde consisting essentially of the reaction products obtained by:
    (A) sulfonation of phenols with from 1.0 to 1.5 mols of sulfuric acid per mole of phenol; and
    (B) acid catalyzed condensation of the product of sulfonation of said phenols with
        a) from 0.5 to 1.8 moles of urea per mole of phenol,
        b) from 0.001 to 0.5 mole of at least one other organic nitrogen base per mole of phenol, said other organic nitrogen base is selected from the group consisting of melamine, hydroxy-($C_{2-20}$-alkyl)-melamine, bis-hydroxy-($C_{2-20}$-alkyl)-melamine, tris-hydroxy ($C_{2-20}$-alkyl) melamine, hydroxyaryl melamine and poly(alkylene oxide)-substituted melamine, melem, hydroxy($C_{2-20}$-alkyl)melem, poly(alkylene oxide) substituted melem, guanamine, N-hydroxy($C_{2-20}$-alkyl)-guanamine, poly(alkylene oxide) substituted guanamine dicyanodiamide, and mixtures thereof, and
    c) from 1.0 to 3.0 moles of formaldehyde per mole of phenol,
said acid catalyzed condensation proceeding by initially adding components a) and b) in any order to the sulfonated phenol (A) and then subsequently adding formaldehyde component c) and conducting the condensation reaction as formaldehyde is added to the reaction mixture.

2. A process for manufacturing a condensation polymer of sulfonated phenol, urea, other organic nitrogen-bases and formaldehyde consisting essentially of reacting, using acid catalysis,
    (A) phenols which are sulfonated with from 1.0–1.5 moles of sulfuric acid per mole of phenol;
    (B) from 0.5–1.8 moles of urea per mole of phenol;
    (C) from 0,001 to 0.5 moles of at least one other organic nitrogen-base per mole of phenol, said other organic nitrogen base is selected from the group consisting of melamine, hydroxy-($C_{2-20}$-alkyl)-melamine, bis-hydroxy-($C_{2-20}$-alkyl)-melamine, tris-hydroxy($C_{2-20}$-alkyl melamine, hydroxyaryl melamine and poly(alkylene oxide) substituted melamine, melem, hydroxy($C_{2-20}$-alkyl)melem, poly(alkylene oxide) substituted melem, guanamine, N-hydroxy($C_{2-20}$-alkyl)guanamine, poly(alkylene oxide) substituted guanamine dicyanodiamide, and mixtures thereof, and
    (D) from 1.0 to 3.0 moles of formaldehyde per mole of phenol, with the proviso that components (A), (B) and (C) are initially combined and subsequently adding formaldehyde (D) to conduct the condensation reaction.

3. A tanning agent for self-tanning, pre-tanning and co-tanning of unhaired hides and unhaired skins and for post-tanning of leather and pelts consisting essentially of the condensation polymer of claim 1 and water.

4. A process for self-tanning, pre-tanning, and co-tanning of unhaired hides and unhaired skins and for post-tanning of leather and pelts, comprising treating said unhaired hides, unhaired skins, tanned leather or tanned pelts with the condensation polymer of claim 1.

5. A redispersible polymer powder consisting essentially of a polymer powder and the condensation polymer of claim 1.

6. A process for atomizing polymer dispersions for the manufacture of redispersible polymer powders comprising treating a polymer dispersion with the condensation polymer claim 1; and
atomizing said polymer dispersion.

7. The condensation polymer of claim 1, wherein said phenol is selected from the group consisting of halophenols, alkyl phenols, unsubstituted phenol, bisphenols and dihydroxydiphenylsulfones.

* * * * *